United States Patent Office 2,738,892
Patented Mar. 20, 1956

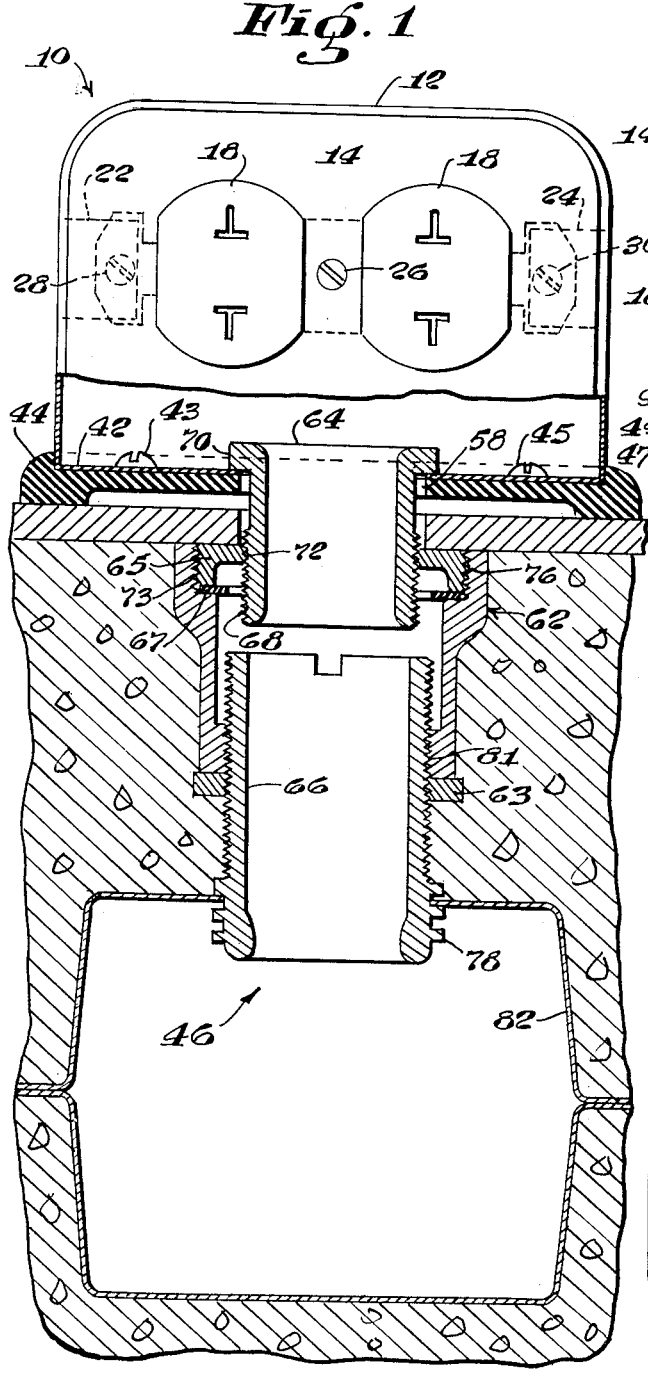
March 20, 1956
J. W. WIESMANN
2,738,892
ELECTRICAL FLOOR FITTING
Filed Sept. 23, 1952
INVENTOR.
Joseph W. Wiesmann
BY
J Stanley Churchill
ATTORNEY

2,738,892

ELECTRICAL FLOOR FITTING

Joseph W. Wiesmann, Pittsburgh, Pa., assignor to H. H. Robertson Company, Pittsburgh, Pa., a corporation of Pennsylvania Application September 23, 1952, Serial No. 311,128

2 Claims. (Cl. 220—3.3)

This invention relates to an electrical floor fitting for use with an underfloor wire distribution system.

The invention has for an object to provide a novel and improved electrical floor fitting for use with an underfloor wire distribution system forming an outlet to which various electrical fixtures and appliances may be connected.

A further object is to provide an electrical floor fitting which because of its novel and improved structure is waterproof and, therefore, the possibility of the circuit being short-circuited by water from the use of floor-cleaning mops and the like is materially diminished.

A still further object is to provide a novel and improved floor fitting of the type referred to which may be easily taken apart for repair purposes or removed and relocated at a different part of the floor with a minimum of difficulty.

With these general objects in view and such others as may hereinafter appear, the invention consists in the novel electrical floor fitting and parts thereof hereinafter described and particularly defined in the claims at the end of this specification.

In the drawings illustrating the preferred embodiment of the present invention:

Fig. 1 is a side elevation partially in section illustrating the present floor fitting and floor-tap connections;

Fig. 2 is an end view of the floor fitting partly in cross section; and

Fig. 3 is a plan view of the resilient base of the present invention.

In general, the present invention contemplates a novel and improved electrical fitting for use with an underfloor wire distribution system of the type illustrated in United States patent to J. H. Young et al., No. 2,125,366. The present fitting contemplates a new and improved outlet box which is arranged to be mounted upon and set into a resilient gasket type base and connected by various connections to a wire-carrying cell of the underfloor wiring system. The present floor fitting is economical to manufacture, easily repaired or replaced and very efficient in use.

Referring now to the drawings illustrating the preferred embodiment of the present invention, the present electrical floor outlet comprises an outlet box member, indicated generally at 10, including an inverted U-shaped metal section 12 which comprises the top and ends of the box, a bottom plate 42 and two side plates 14, 16 which are assembled to form a compact outlet box 10. In the preferred form of the invention the U-shaped section 12 and side plates 14, 16 are formed of aluminum having preferably a satin finish imparted an attractive appearance and minimizing rusting and corrosion.

In order that various electrical fixtures and appliances may be supplied with electrical power from the present outlet box 10, the side plate 14 is provided with a pair of adjacent apertures arranged to have secured therein a pair of receptacles 18. The receptacles 18 are secured in operative position by means of flanges 22, 24 and by screws 28, 30, and a screw 26 serves to secure the side plate 14 in operative position. The receptacles 18 are operatively connected to the wire service within the outlet box in any usual or preferred manner and are designed to permit any of the usual commercial fixtures to be plugged into said receptacles to be supplied with electricity.

The side plate 16 is arranged to enclose the back portion of the box and is removably secured in position by means of the screw 32.

Referring now to Fig. 2 illustrating the construction of the outlet box 10, the substantially U-shaped section 12 is arranged to be positioned between side plates 14, 16 and forms the top and two narrow end-wall portions of the box, and is provided with a raised upper section 34, and downwardly and outwardly bent flanges 36, 37 along its outer side plate engaging edges. The side plates 14, 16 are bent inwardly at their upper edges to form shoulders 38, 40 which rest upon flanges 36, 37 when the members are assembled. Thus, a snug fit is made between the U-shaped section 12 and the adjacent side plates 14, 16. The U-shaped section has secured thereto a bottom plate 42 provided with a central aperture, to be described, the bottom plate being welded or otherwise secured to the end-wall portions of the body section 12. The side plates 14, 16 are of a length such as to extend a short distance below the bottom plate in the assembled fitting.

As illustrated in Figs. 1 and 2, a gasket type base 44 to which the outlet box 10 is secured by means of screws 43, 45 is provided for mounting the outlet box in operative position on the floor-tap fitting 46. A pair of longitudinal grooves 47 are provided in the upper surface of the gasket member for the purpose of receiving the lower edges 48, 50 of the side plates 14, 16 therein and maintaining the same in a fixed position.

The resilient base 44 is substantially rectangular in form and is provided with a recessed portion 90 in its upper surface arranged to receive the U-shaped body portion 12 so that the end walls thereof fit snugly into the ends 92, 94 of the recessed portion, the side plates 14, 16 being extended into the grooves 47. The underside of the base 44 is also preferably recessed, as shown, so that the peripheral edges 52 of the bottom of the base may be firmly clamped to the floor surface to form a tight and substantially waterproof joint therewith. As hereinillustrated, the central aperture in the bottom plate 42 is aligned with a central aperture 58 in the base 44 for receiving the flanged upper portion of the floor-tap fitting therein. As thus defined it will be seen that bottom plate 42 and end-wall portions of the body portion 12 are snugly fitted into the upper recessed portion of the base, and the side plates 14, 16 detachably fitted against the continuous flanges 36, 37 of the body engage the sides of the bottom plate 42 and extend below the bottom plate into the grooves 47, thus forming a substantially waterproof joint between the fitting and the base 44 in the assembled unit.

As may readily be seen from the description thus far, the present outlet box is a very compact unit mounted upon a resilient base such that the unit is substantially waterproof and easily connected to the wire service of an underfloor wire distribution system by means hereinafter to be described.

In order that the outlet box 12 may be connected to the underfloor wiring system, a floor-tap member 46 is provided having a hollow central member 62 provided with an upper extension 64, a disk member 65 and a lower extension 66. The upper extension 64 consists of a cylindrical member having a threaded lower end portion 68 and an outwardly extended flanged upper portion 70. The flanged portion is arranged to bear against the marginal edges of the central aperture 58 in the outlet base and gasket as shown in Fig. 1. The threaded end portion is arranged to engage internal threads 72 provided in the central disk member 65, said disk member having external threads 73 which engage threads 76 in the central member 62 of the floor tap. A rubber washer 67 may be provided between the member 65 and a shouldered portion of the member 62.

The lower extension 66 is provided with a square threaded end portion 78 and is provided with V-threads the remainder of its length. As illustrated in Fig. 1, the central member 62 is provided with a threaded aperture 81 in its lower end adapted to receive and support therein the V-threaded portion of the extension 66. An aperture is formed in the underlying cell 82 of the wiring system of a size to receive therein the square threaded end of the extension 66. The extension 66 is threadedly engaged with said aperture, and the upper threaded end thereof is screwed into the threaded aperture 81 in the central member 62, a lock nut 63 being provided to maintain the parts in their adjusted position. Thus, the upper and lower extensions are arranged to be adjusted into or out of the central member 62. Therefore, the underlying cell is connected to the floor fitting, and the wire service carried by the cell carried upwardly to be connected to the floor fitting to supply electrical service to any fixtures or appliances which are plugged into the receptacles 18.

It will be observed that in the installation and assembly of the present floor fitting the body portion 12 may be connected to the base member 44 by screws 43, 45. The flanged member 64 may then be extended through the aperture 58 and threadedly engaged with the floor-connecting elements described to clamp the fitting to the floor surface. After the necessary electrical connections are made, the side plates 14, 16 may be extended into the grooves 47 and over the shouldered portions 36, 37 of the body portion whereupon the side plates may be secured by the screws 26 and 32 as described.

The entire floor-tap member 46 may be raised or lowered, depending upon the thickness of the concrete floor fill, in order that the upper extension will engage the floor fitting, and the lower extension the underlying cell. In order to secure the floor fitting in operative position, the upper extension is screwed down tightly and firmly secures the floor fitting in operative position over the underlying cell and in substantially waterproof engagement with the floor surface.

As may be easily seen from the above description, the present novel and improved floor fitting provides an economical, very efficient, attractive device for providing electrical service within a building provided with an underfloor wire distribution system. The present construction further provides a dust and/or waterproof fitting which substantially eliminates power failures due to short circuits resulting from effect of water seeping into the system from cleaning mops and the like.

Having thus described the present invention, what is claimed is:

1. In an electrical floor fitting having a rectangular outlet box provided with integral top, bottom and end walls and separate side walls, each extending below the bottom wall, a resilient base member having a rectangular shaped recess in the upper surface thereof into which the bottom wall of the outlet box is snugly fitted, and having means securing the bottom wall to the base, said base having formed therein side wall grooves into which the extended portions of the side walls are received and gripped by the base.

2. An electrical floor fitting as defined in claim 1 wherein the resilient base member is provided with a recessed under surface forming peripheral floor engaging and sealing means for forming a waterproof joint when the fitting is clamped in operative position.

References Cited in the file of this patent

UNITED STATES PATENTS

| 1,820,995 | Wehman | Sept. 1, 1931 |
| 1,907,661 | Phillips | May 9, 1933 |
| 1,962,915 | Sharp | June 12, 1934 |
| 1,965,087 | Sharp | July 3, 1934 |
| 2,029,393 | Sargent | Feb. 4, 1936 |
| 2,119,428 | Englar | May 31, 1938 |
| 2,164,221 | Raney et al. | June 27, 1939 |

FOREIGN PATENTS

| 53,566 | Norway | Feb. 19, 1934 |